(12) United States Patent
Sakabe (10) Patent No.: US 9,684,365 B2
(45) Date of Patent: Jun. 20, 2017

(54) RESPONDING DEVICE AND RESPONDING METHOD

(71) Applicant: KYOCERA Document Solutions Inc., Osaka (JP)

(72) Inventor: Keiji Sakabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 103 days.

(21) Appl. No.: 14/549,794

(22) Filed: Nov. 21, 2014

(65) Prior Publication Data

US 2015/0149804 A1 May 28, 2015

(30) Foreign Application Priority Data

Nov. 28, 2013 (JP) .................................. 2013-245682

(51) Int. Cl.
*G06F 1/32* (2006.01)

(52) U.S. Cl.
CPC .......... *G06F 1/3293* (2013.01); *G06F 1/3209* (2013.01); *Y02B 60/121* (2013.01)

(58) Field of Classification Search
CPC .............................. G06F 1/32; Y02B 60/121
USPC ........................................................ 713/323
See application file for complete search history.

(56) References Cited

U.S. PATENT DOCUMENTS 7,352,486 B2 * 4/2008 Tsuchiya ............... G06F 1/3287
358/1.13

8,214,676 B2 * 7/2012 Katoh ................ G03G 15/5004
713/324
8,732,497 B2 5/2014 Yokokura
(Continued)

FOREIGN PATENT DOCUMENTS

JP      2010-094925 A    4/2010
JP      2010-166310 A    7/2010
(Continued)

OTHER PUBLICATIONS

An Office Action; "Notice of Reasons for Rejection," issued by the Japanese Patent Office on Feb. 23, 2016, which corresponds to Japanese Patent Application No. 2013-245682 and is related to U.S. Appl. No. 14/549,794.

*Primary Examiner* — Nitin Patel
*Assistant Examiner* — Kevin Stewart
(74) *Attorney, Agent, or Firm* — Studebaker & Brackett PC (57) ABSTRACT

A responding device has operating modes including a first mode and a second mode. The responding device includes a first responding unit and a second responding unit. The first responding unit operates during the first mode and outputs, when receiving a request, a response including information in accordance with the type of the request. The second responding unit outputs the response in place of the first responding unit during the second mode. The second responding unit includes a storage section, an information accumulation section, and a mode transition control section. The information accumulation section stores in the storage section the information included in the response output from the first responding unit during the first mode. The mode transition control section causes the responding device to transition to the second mode when a first condition and a second condition in terms of the information stored in the storage section are satisfied.

6 Claims, 6 Drawing Sheets

(56) References Cited

U.S. PATENT DOCUMENTS

| | | | |
|---|---|---|---|
| 2006/0218440 A1* | 9/2006 | Inoue | G06F 1/3209 |
| | | | 714/12 |
| 2008/0282100 A1* | 11/2008 | Chen | G06F 1/3203 |
| | | | 713/322 |
| 2011/0019218 A1 | 1/2011 | Kuwahara | |
| 2012/0137150 A1 | 5/2012 | Yokokura | |
| 2012/0198259 A1* | 8/2012 | Suzuki | G06F 1/3284 |
| | | | 713/323 |
| 2014/0006821 A1* | 1/2014 | Fujisawa | G06F 1/3209 |
| | | | 713/320 |

FOREIGN PATENT DOCUMENTS

| | | |
|---|---|---|
| JP | 2011-028461 A | 2/2011 |
| JP | 2012-118635 A | 6/2012 |
| JP | 2013-061873 A | 4/2013 |

\* cited by examiner

FIG. 1

| IP address | MAC address |
|---|---|
| 192.168.0.123 | 00 : C0 : EE : AE : AB : C8 |

| No. | OID | Data | |
|---|---|---|---|
| | | Type | Data value |
| 1 | 1.3.6.1.2.1.2.2.1.1.1 | INTEGER | 1 |
| 2 | 1.3.6.1.2.1.2.2.1.2.1 | STRING | eth0 |
| 3 | 1.3.6.1.2.1.2.2.1.3.1 | INTEGER | 6 |
| 4 | 1.3.6.1.2.1.2.2.1.4.1 | INTEGER | 1500 |
| 5 | 1.3.6.1.2.1.2.2.1.5.1. | Gauge32 | 0 |
| ⋮ | ⋮ | ⋮ | ⋮ |

FIG. 6 ized known which receives a request via a communication network and sends a response to the request received. Examples of the responding device include image forming apparatuses such as printers, multifunction printers, and multifunction peripherals (MFPs). For energy saving, an image forming apparatus being a responding device transitions to a power-saving operating mode (hereinafter, referred to as "standby mode") once a predetermined period of time has passed while a user is not using the image forming apparatus. However, once in the standby mode, the image forming apparatus takes time to transition back to an operating mode in which the user can use the image forming apparatus (hereinafter, referred to as "normal mode").

RESPONDING DEVICE AND RESPONDING METHOD

INCORPORATION BY REFERENCE

The present application claims priority under 35 U.S.C. §119 to Japanese Patent Application No. 2013-245682, filed Nov. 28, 2013. The contents of this application are incorporated herein by reference in their entirety.

BACKGROUND

The present disclosure relates to responding devices and responding methods.

A responding device has been conventionally known which receives a request via a communication network and sends a response to the request received. Examples of the responding device include image forming apparatuses such as printers, multifunction printers, and multifunction peripherals (MFPs). For energy saving, an image forming apparatus being a responding device transitions to a power-saving operating mode (hereinafter, referred to as "standby mode") once a predetermined period of time has passed while a user is not using the image forming apparatus. However, once in the standby mode, the image forming apparatus takes time to transition back to an operating mode in which the user can use the image forming apparatus (hereinafter, referred to as "normal mode").

For example, when a host computer sends information request data (a request) for acquiring information about the image forming apparatus to the image forming apparatus in the standby mode via the communication network, the image forming apparatus transitions from the standby mode to the normal mode and sends response data (a response). It therefore takes some time before the response data is sent, slowing response. Furthermore, when the host computer sends information request data a number of times, the image forming apparatus transitions from the standby mode to the normal mode a number of times. As a result, the image forming apparatus can stay in the standby mode for a shorter period of time, and thus the energy-saving effect is reduced.

To deal with the problem, a technique is directed to allowing the response data to be sent while the apparatus is in the standby mode. For example, a certain image processing device includes two central processing units (CPUs) including a main CPU for responding during the normal mode and a sub-CPU for responding during the standby mode.

In such an image processing device, the main CPU first stores the response data sent in a random access memory (RAM) of the main CPU during the normal mode. Then, when the image processing device transitions to the standby mode, the sub-CPU retrieves frequently used response data out of the RAM of the main CPU and stores the data in a RAM of the sub-CPU.

Thus, frequently used data is stored in the RAM of the sub-CPU when the image processing device transitions from the normal mode to the standby mode. Consequently, the sub-CPU can create response data using the data stored in the RAM of the sub-CPU and send the data during the standby mode.

SUMMARY

A responding device according to an aspect of the present disclosure has at least two operating modes including a first mode and a second mode. The responding device includes a first responding unit and a second responding unit. The first responding unit operates during the first mode and outputs, when receiving a request out of one or more types of requests via a communication network, a response including information in accordance with the type of the request. The second responding unit outputs the response in place of the first responding unit during the standby mode where operation of the first responding unit is halted. The second responding unit includes a storage section capable of storing therein the information, an information accumulation section, and a mode transition control section. The information accumulation section stores in the storage section the information included in the response output from the first responding unit during the first mode. The mode transition control section controls the responding device to transition to the second mode when a first condition predetermined in terms of transition from the first mode to the second mode and a second condition predetermined in terms of the information stored in the storage section are satisfied.

A responding method according to another aspect of the present disclosure is performed by a responding device having at least two operating modes including a first mode and a second mode, and including a first responding unit and a second responding unit having a storage section. The responding method includes:

(1) outputting, by the first responding unit, a response during the first mode when receiving a request out of one or more types of requests via a communication network, the response including information in accordance with the type of the request;

(2) storing in the storage section the information included in the response output from the first responding unit during the first mode;

(3) controlling the responding device to transition to the second mode when a first condition predetermined in terms of transition from the first mode to the second mode and a second condition predetermined in terms of the information stored in the storage section are satisfied during the first mode; and (4) outputting, by the second responding unit in place of the first responding unit, the response during the second mode where operation of the first responding unit is halted.

DETAILED DESCRIPTION

Hereinafter, an embodiment of the present disclosure will be described with reference to the accompanying drawings.

Figure 1:
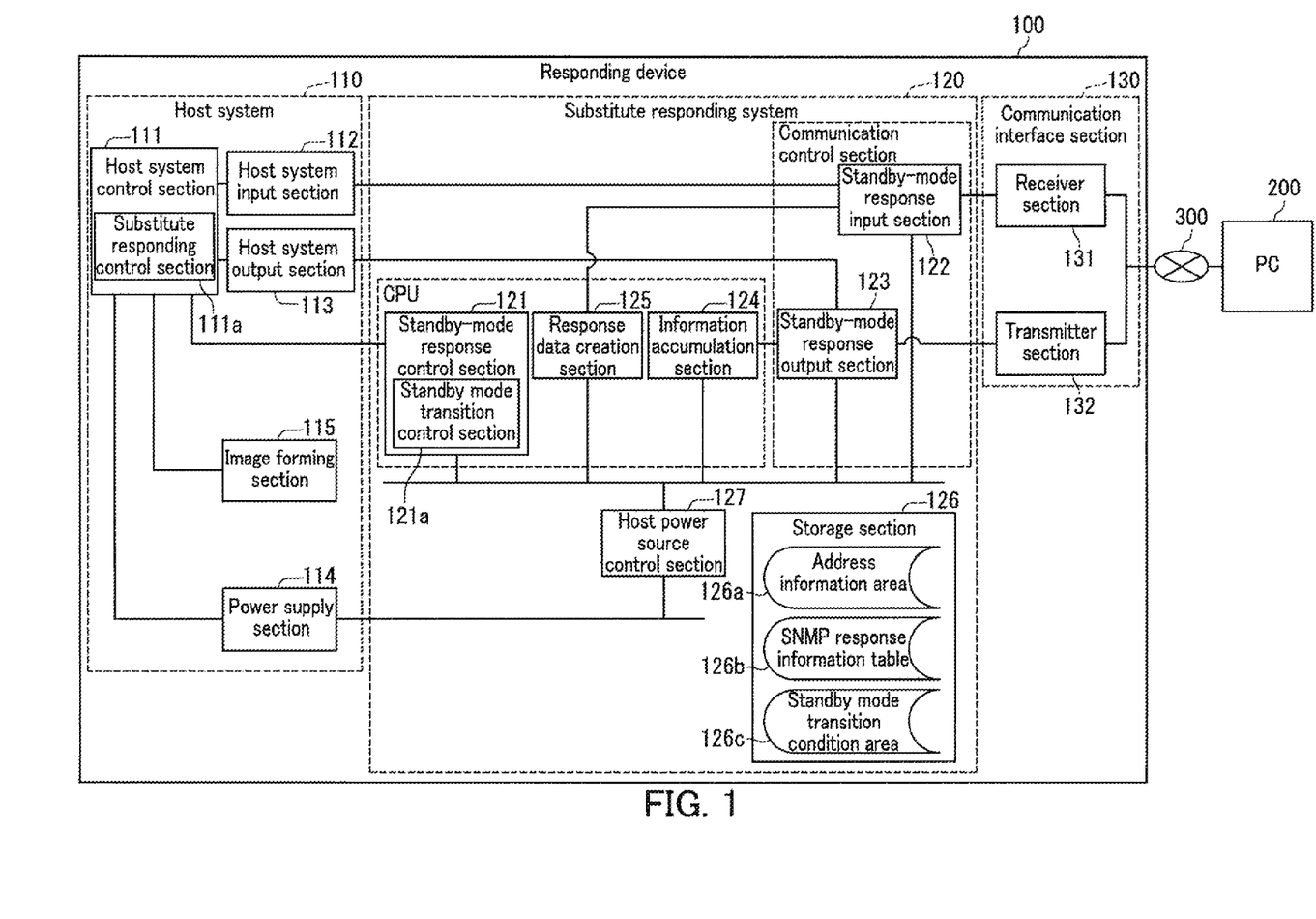
FIG. 1 is a configuration diagram of an example of a responding device according to an embodiment of the present disclosure.

FIG. 1 is a configuration diagram of an example of a responding device 100 according to the present embodiment.

The responding device 100 according to the present embodiment includes a host system 110 (first responding unit) and a substitute responding system 120 (second responding unit). The responding device 100 has at least two operating modes including a normal mode (first mode) and a standby mode (second mode). The host system 110 operates during the normal mode and outputs, when receiving a type of information request data (request) out of one or more types of information request data via a communication network 300, response data (response) including information in accordance with the type of the information request data. The substitute responding system 120 outputs the response data in place of the host system 110 during the standby mode where operation of the host system 110 is halted.

All functions of the host system 110 and the substitute responding system 120 are usable during the normal mode. During the normal mode, the host system 110 sends the response data corresponding to the information request data sent from a personal computer (PC) 200 being a host computer. During the standby mode, on the other hand, the supply of electric power to the host system 110 is interrupted for power saving. The substitute responding system 120 sends the response data in place of the host system 110 during the standby mode where operation of the host system 110 is halted.

The substitute responding system 120 accumulates information for creating the response data during the normal mode so as to be able to respond during the standby mode. The substitute responding system 120 creates the response data using the accumulated information during the standby mode. Therefore, the responding device 100 does not need to transfer information for creating the response data from the host system 110 to the substitute responding system 120 when transitioning from the normal mode to the standby mode. Thus, the transition time taken by the responding device 100 to transition from the normal mode to the standby mode is shortened.

The responding device 100 receives information request data from the PC 200 and sends response data to the PC 200 via the communication network 300.

In the present embodiment, the responding device 100 is an image forming apparatus such as a printer, a multifunction printer, or a multifunction peripheral. The PC 200 is a host computer that sends the information request data to the responding device 100 and receives the response data corresponding to the information request data from the responding device 100.

The responding device 100 includes the host system 110, the substitute responding system 120, and a communication interface section 130.

The host system 110 receives input of the information request data and outputs the response data corresponding to the information request data when the responding device 100 is in the normal mode. When the responding device 100 is in the standby mode, electric power is not supplied to the host system 110 and therefore the functions thereof are suspended.

The host system 110 includes a host system control section 111, a host system input section 112, a host system output section 113, a power supply section 114, and an image forming section 115.

The host system control section 111 includes memories such as a random access memory (RAM) and a read only memory (ROM), and a central processing unit (CPU). The host system control section 111 includes a substitute responding control section 111a. The substitute responding control section 111a performs various types of control of the substitute responding system 120. For example, the substitute responding control section 111a sends to the substitute responding system 120 a request for transition to the standby mode in order to cause the responding device 100 to transition to the standby mode.

The host system input section 112 inputs into the host system control section 111 the information request data output from the substitute responding system 120.

The host system output section 113 outputs the response data to the substitute responding system 120.

The power supply section 114 supplies electric power to each section of the host system 110. The power supply section 114 supplies electric power to each section of the host system 110 once a power source thereof has been turned on, controlled by the substitute responding system 120. The power supply section 114 stops supplying electric power to each section of the host system 110 once the power source thereof has been turned off, controlled by the substitute responding system 120.

The image forming section 115 forms an image on paper based on a command from the PC 200.

The substitute responding system 120 inputs into the host system 110 the information request data input from the communication interface section 130 during the normal mode. The substitute responding system 120 outputs to the communication interface section 130 the response data input from the host system 110. The substitute responding system 120 creates the response data corresponding to the information request data input from the communication interface section 130 during the standby mode. The substitute responding system 120 then outputs the response data to the communication interface section 130.

The substitute responding system 120 includes a standby-mode response control section 121, a standby-mode response input section 122, a standby-mode response output section 123, an information accumulation section 124, a response data creation section 125, a storage section 126, and a host power source control section 127. The sections 121 to 127 of the substitute responding system 120 are interconnected by a bus.

Functions of the standby-mode response control section 121, the response data creation section 125, and the information accumulation section 124 are implemented through execution of computer programs by a CPU. The standby-mode response input section 122 and the standby-mode response output section 123 form a communication control section.

The standby-mode response control section 121 includes memories such as a RAM and a ROM. The standby-mode response control section 121 includes a standby mode transition control section 121a (mode transition control section). The standby mode transition control section 121a determines whether or not the information accumulated in the storage section 126 satisfies a standby mode transition condition when the responding device 100 is to transition from the normal mode to the standby mode. The standby mode transition condition will be described later.

The standby-mode response input section 122 inputs into the host system input section 112 or into the response data creation section 125 the information request data output from the communication interface section 130.

The standby-mode response output section 123 outputs the response data to the communication interface section 130 and to the information accumulation section 124.

The information accumulation section 124 accumulates in the storage section 126 information of the response data output from the host system 110 to the communication interface section 130 via the standby-mode response output section 123.

The response data creation section 125 creates the response data corresponding to the information request data when the responding device 100 is in the standby mode.

The storage section 126 includes a hard disk drive (HDD), a flash memory, and so on. The storage section 126 includes an address information area 126a, an SNMP response information table 126b, and a standby mode transition condition area 126c. Configurations of the address information area 126a and the SNMP response information table 126b will be described later with reference to FIGS. 2A and 2B. No information is set in the SNMP response information table 126b upon activation of the responding device 100.

The host power source control section 127 controls the power source of the power supply section 114 of the host system 110 to be turned on or off. For example, when the responding device 100 is to transition from the standby mode to the normal mode, the host power source control section 127 turns on the power source of the power supply section 114 to resume the supply of electric power to the host system 110.

The communication interface section 130 includes a detachable local area network (LAN) interface enabling connection to the communication network 300. The communication interface section 130 includes a receiver section 131 and a transmitter section 132.

Once the receiver section 131 has received one or more packets (hereinafter, referred to as "request packets") forming the information request data from the PC 200, the receiver section 131 outputs the information request data based on the request packets to the substitute responding system 120.

Once the response data has been input from the substitute responding system 120, the transmitter section 132 sends one or more packets (hereinafter, referred to as "response packets") forming the response data to the PC 200.

Figure 2A:
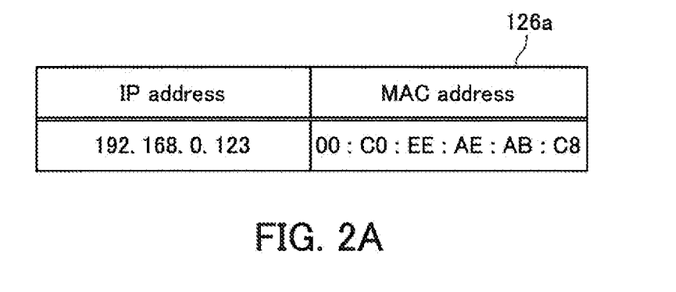
FIG. 2A is a configuration diagram of an example of an address information area.
Figure 2B:
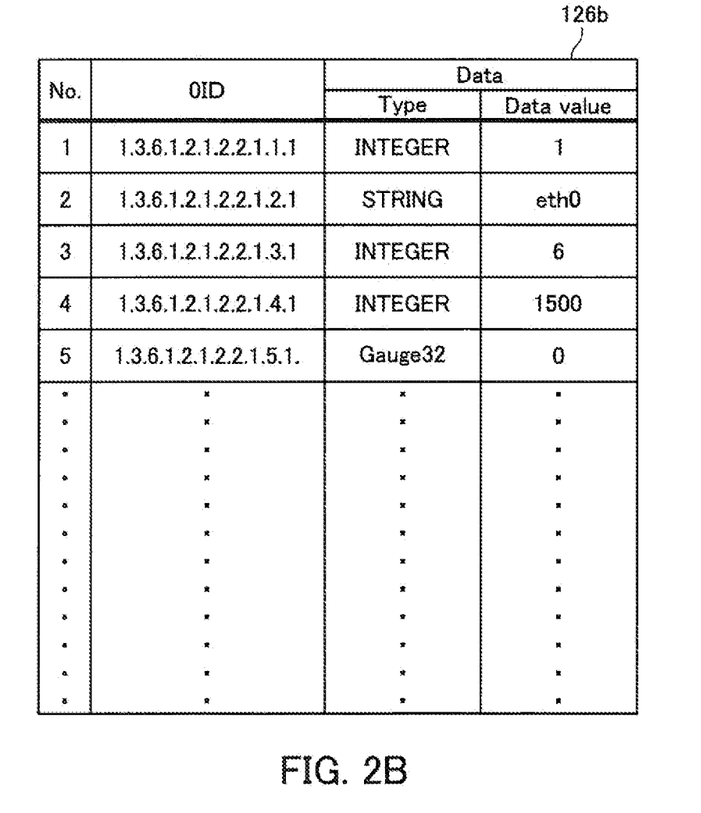
FIG. 2B is a configuration diagram of an example of an SNMP response information table

Next, configurations of the address information area 126a and the SNMP response information table 126b included in the storage section 126 of the substitute responding system 120 will be described. FIG. 2A is a configuration diagram of an example of the address information area 126a. FIG. 2B is a configuration diagram of an example of the SNMP response information table 126b.

First, the configuration of the address information area 126a will be described. The address information area 126a includes information items of "IP address" and "MAC address". An IP address of the responding device 100 is prestored in "IP address". A MAC address corresponding to the IP address of the responding device 100 is prestored in "MAC address". The IP address and the MAC address of the responding device 100 can be set in the response data.

Next, the configuration of the SNMP response information table 126b will be described. The SNMP response information table 126b accumulates therein information of the response data corresponding to the information request data provided by the simple network management protocol (SNMP) (hereinafter, referred to as "SNMP information"). The SNMP response information table 126b includes information items of "No.", "OID (object identifier)", and "Data". A number given to each set of an "OID" and a "Data" is stored in "No.".

An identifier given to each object of management information stored in the management information base (MIB) provided by the SNMP is stored in "OID". Data of the object (hereinafter, referred to as "object data") represented by each identifier stored in "OID" is stored in "Data". The object data can be set in the response data. The "Data" includes information items of "Type" and "Data value". Information representing the type of each "Data value" is stored in "Type". For example, when the type of the "Data value" is integer, "INTEGER" is stored in "Type". The object data is stored in "Data value".

Next, predetermined conditions that are taken into consideration when it is determined whether or not the device should transition from the normal mode to the standby mode (hereinafter, referred to as "transition conditions") will be described. The transition conditions include a first condition and the standby mode transition condition (second condition) to be described later. The first condition is used to determine when to transition, for example. Specifically, the first condition is that "A predetermined period of time has passed" or that "A command to transition to the standby mode has been received from a user".

The standby mode transition condition is a transition condition in terms of the information stored in the storage section 126. The standby mode transition condition is set in a factory default condition (hereinafter, referred to as "initial condition"), for example. The host system 110 can change the set standby mode transition condition during the normal mode.

Some different levels of conditions may be prepared as the standby mode transition condition. Accordingly, the host system 110 may be able to select one of the different levels of conditions at any time. For example, a minimum necessary level of standby mode transition condition is that "An IP address and a MAC address are stored", in other words, that "Address information is stored". This condition may be the initial condition of the standby mode transition condition.

A condition at a more stringent level than the minimum necessary level (i.e., condition requiring more information to be stored) may be that "An IP address, an MAC address, and SNMP information are stored", in other words, that "SNMP information is stored in addition to address information", for example. Under such a level of condition set as the standby mode transition condition, the device is not allowed to transition to the standby mode when no object data is stored in the SNMP response information table 126b. Thus, such a level of condition ensures the responsiveness to the information request data in network management by the SNMP.

Examples of the level of the standby mode transition condition associated with the SNMP include the following levels (1) to (3).

(1) Information necessary for the PC 200 to confirm whether the responding device 100 is online or offline is stored.
(2) Information necessary for utility software for monitoring the state of the responding device 100 and notifying of a change in the state is stored.
(3) Information necessary for utility software for setting or referring to information of the responding device 100 is stored.

By offering a plurality of levels of selectable standby mode transition conditions associated with the SNMP as described above, it is possible to set a more detailed condition for the transition to the standby mode, and thus it is possible to increase convenience to users.

The standby mode transition condition is set in the standby mode transition condition area 126c by the standby mode transition control section 121a based on a command from the substitute responding control section 111a, for example.

It is significant that the responding device 100 offers different levels of standby mode transition conditions and they are selectable at any time. The following describes the significance.

The standby mode involves the following advantage and disadvantage. That is, it is an advantage for users in terms of reducing power consumption that the responding device 100 stays in the standby mode for a longer period of time. In another respect, it is a disadvantage when information request data is received during the standby mode to which a response cannot be sent unless the responding device 100 transitions back to the normal mode, because the device takes time to transition back to the normal mode before sending the response, impairing its responsiveness.

On the other hand, the normal mode involves the following advantage and disadvantage. That is, it is an advantage that the responding device 100 is responsive when in the normal mode. In terms of reducing power consumption, however, it is a disadvantage that the responding device 100 stays in the normal mode for a longer period of time.

As described above, both the case where the responding device 100 is in the standby mode and the case where the responding device 100 is in the normal mode involve advantages and disadvantages. It is therefore important to select a standby mode transition condition in view of the advantages and the disadvantages so that the device can be both in the standby mode and in the normal mode in good balance. To this end, it is significant that the responding device 100 offers different levels of selectable standby mode transition conditions.

Next, flows of processes to be performed by the responding device 100 according to the present embodiment will be described. The responding device 100 according to the present embodiment performs a normal-mode process to be performed during the normal mode, a process of transitioning to the standby mode, a standby-mode process to be performed during the standby mode, and a process of transitioning to the normal mode. The responding device 100 is in the normal mode and performs the normal-mode processing upon activation.

Figure 3:
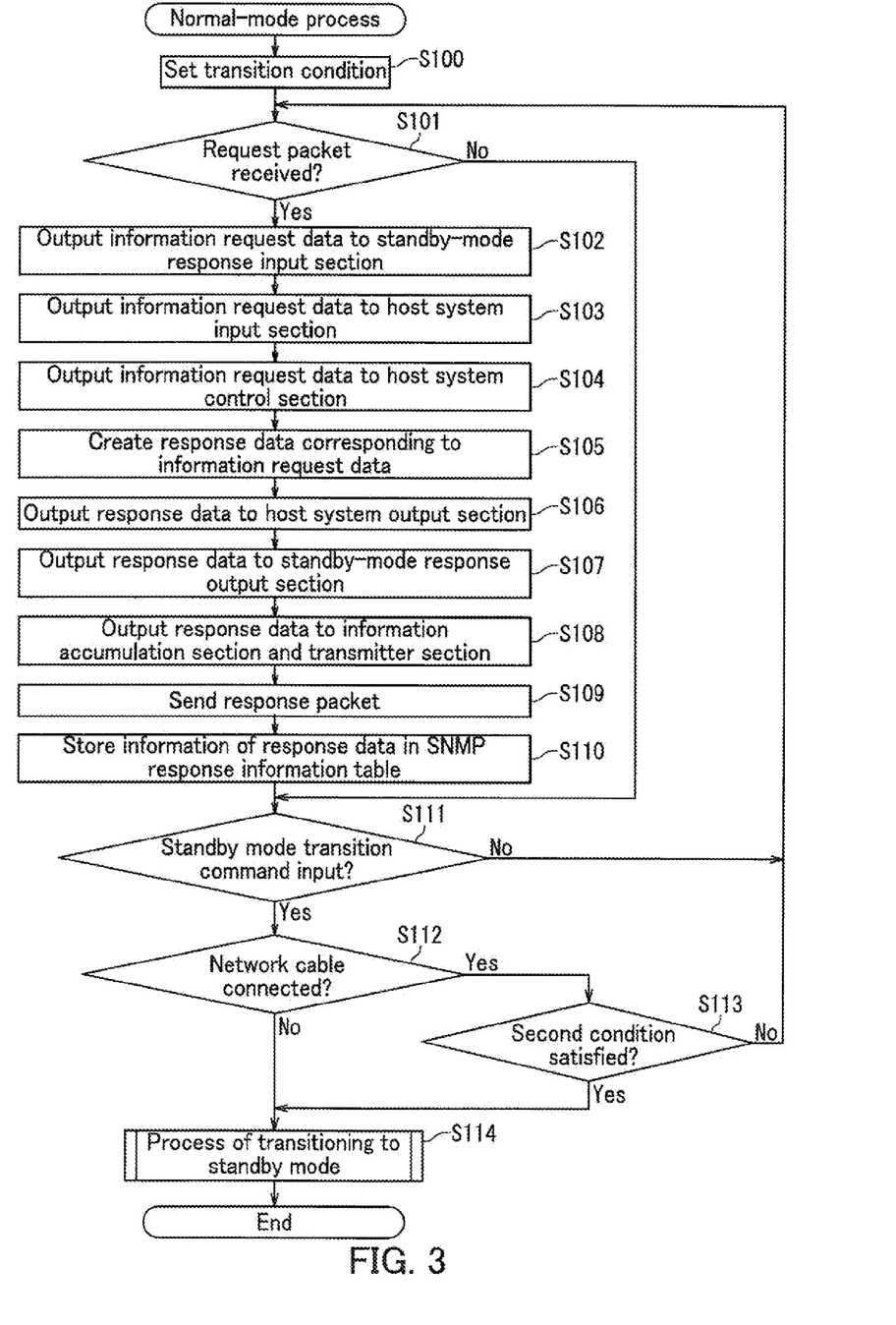
FIG. 3 is a flowchart of a process to be performed during a normal mode.

FIG. 3 is a flowchart of the normal-mode process.
(Step S100)

First, the substitute responding control section 111a of the host system 110 directs the standby mode transition control section 121a of the substitute responding system 120 to set the standby mode transition condition. The standby mode transition condition set is stored in the standby mode transition condition area 126c in the storage section 126.

In the present embodiment, the setting of the standby mode transition condition is performed at the beginning of the normal-mode process. However, the present disclosure is not limited to the embodiment, and the setting may be performed at any time while the responding device 100 is in the normal mode.

Even if the setting in Step S100 is not performed, the standby mode transition condition is ready as the initial condition and taken into consideration when the device transitions from the normal mode to the standby mode. The responding device 100 may set the standby mode transition condition based on a command from a user. Thus, the user can set an appropriate level of standby mode transition condition suitable for an environment in which the responding device 100 is being used.
(Step S101)

Next, the receiver section 131 determines whether or not any request packets have been received. When the receiver section 131 has received one or more request packets (Yes in Step S101), the process proceeds to Step S102. On the other hand, when the receiver section 131 has not received any request packets (No in Step S101), the process proceeds to Step S111.
(Step S102)

When receiving the request packets (Yes in Step S101), the receiver section 131 outputs information request data based on the request packets to the standby-mode response input section 122.
(Step S103)

Next, the standby-mode response input section 122 outputs to the host system input section 112 the information request data input from the receiver section 131.
(Step S104)

Next, the host system input section 112 outputs to the host system control section 111 the information request data input from the standby-mode response input section 122.
(Step S105)

Next, once the information request data has been input, the host system control section 111 creates response data corresponding to the information request data.
(Step S106)

Next, the host system control section 111 outputs the response data created to the host system output section 113.
(Step S107)

Next, the host system output section 113 outputs to the standby-mode response output section 123 the response data input from the host system control section 111.
(Step S108)

Next, the standby-mode response output section 123 outputs to the information accumulation section 124 and to the transmitter section 132 the response data input from the host system output section 113.
(Step S109)

Next, once the response data has been input, the transmitter section 132 sends one or more packets (response packets) forming response data to an appropriate destination via the communication network 300. For example, when the responding device 100 has received the request packets from the PC 200, the response packets are sent to the PC 200.
(Step S110)

When the response data input from the standby-mode response output section 123 is SNMP response data, the information accumulation section 124 extracts, from the response data, data to be stored in "OID" and data to be stored in "Data". The information accumulation section 124 then stores in the SNMP response information table 126b the data extracted.
(Step S111)

After Step S110 is performed, or when no request packets have been received (No in Step S101), the standby mode transition control section 121a determines whether or not a command to transition to the standby mode (hereinafter, referred to as "standby mode transition command") has been input from the substitute responding control section 111a.

When the standby mode transition command has been input (Yes in Step S111), the process proceeds to Step S112. On the other hand, when the standby mode transition command has not been input (No in Step S111), the process proceeds to Step S101. The standby mode transition command is output from the substitute responding control section 111a to the standby-mode response control section 121 when the first condition is satisfied.

(Step S112)

When the standby mode transition command has been input (Yes in Step S111), the standby mode transition control section 121a determines whether or not the responding device 100 (communication interface section 130) is being physically connected to the communication network 300.

When the responding device 100 is connected to the communication network 300 (Yes in Step S112), the process proceeds to Step S113 in which determination based on the standby mode transition condition is made. On the other hand, when the responding device 100 is not connected to the communication network 300 (No in Step S112), the process proceeds to Step S114. That is, in this case, the process of transitioning to the standby mode is performed regardless of the standby mode transition condition.

Whether or not the responding device 100 (communication interface section 130) is being physically connected to the communication network 300 is determined in Step 5112 for the following reason. That is, when a communication network cable is not being physically connected, there is no communication between the responding device 100 and the PC 200, and therefore information for creating response data is not accumulated.

With the determination made in Step 5112, it is possible to determine whether or not to transition to the standby mode in consideration of the standby mode transition condition only when there is a communication between the responding device 100 and the PC 200.

(Step S113)

When the responding device 100 is connected to the communication network 300 (Yes in Step S112), the standby mode transition control section 121a determines whether or not the standby mode transition condition (second condition) has been satisfied.

Specifically, the standby mode transition control section 121a determines whether or not the standby mode transition condition has been satisfied based on what level of information is stored in the address information area 126a and in the SNMP response information table 126b of the storage section 126, and based on the standby mode transition condition stored in the standby mode transition condition area 126c.

For example, when the standby mode transition condition stored in the standby mode transition condition area 126c is that "An IP address and a MAC address are stored", whether or not an IP address and a MAC address are stored in the address information area 126a is determined When an IP address and a MAC address are stored in the address information area 126a, it is determined that the standby mode transition condition has been satisfied. On the other hand, when an IP address or a MAC address is not stored in the address information area 126a, it is determined that the standby mode transition condition has not been satisfied.

When the standby mode transition condition has not been satisfied (No in Step S113), the responding device 100 does not transition to the standby mode and stays in the normal mode. Accordingly, the process proceeds to Step S101. When the standby mode transition condition has been satisfied (Yes in Step S113), the process proceeds to Step S114. Then, the process of transitioning to the standby mode is performed.

(Step S114)

When the responding device 100 is not connected to the communication network 300 (No in Step S112), or when the standby mode transition condition has been satisfied (Yes in Step S113), the host system control section 111 and the standby-mode response control section 121 perform the process of transitioning to the standby mode. Then, the normal-mode process ends.

Figure 4:
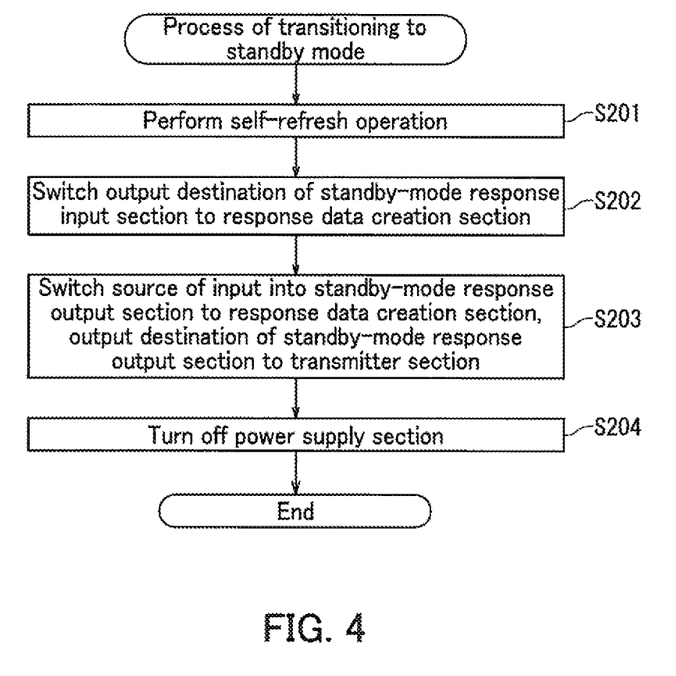
FIG. 4 is a flowchart of a process of transitioning to a standby mode.

FIG. 4 is a flowchart of the process of transitioning to the standby mode (Step S201)

First, the host system control section 111 performs a process (self-refresh operation) of migrating out the data stored in the memories of the host system control section 111 to a disk (not shown).

(Step S202)

Next, the standby mode transition control section 121a switches the output destination of the standby-mode response input section 122 from the host system input section 112 to the response data creation section 125.

(Step S203)

Next, the standby mode transition control section 121a switches the source of the input into the standby-mode response output section 123 from the host system output section 113 to the response data creation section 125. The standby mode transition control section 121a switches the output destination of the standby-mode response output section 123 from both the transmitter section 132 and the information accumulation section 124 to only the transmitter section 132.

(Step S204)

Next, the host power source control section 127 that has received a command from the standby mode transition control section 121a controls the power source of the power supply section 114 to be turned off. Thus, the supply of electric power to each section of the host system 110 is interrupted. Then, the process of transitioning to the standby mode ends. As described above, the power source of the power supply section 114 is turned off to interrupt the supply of electric power to each section of the host system 110, and thus the responding device 100 transitions to the standby mode.

Figure 5:
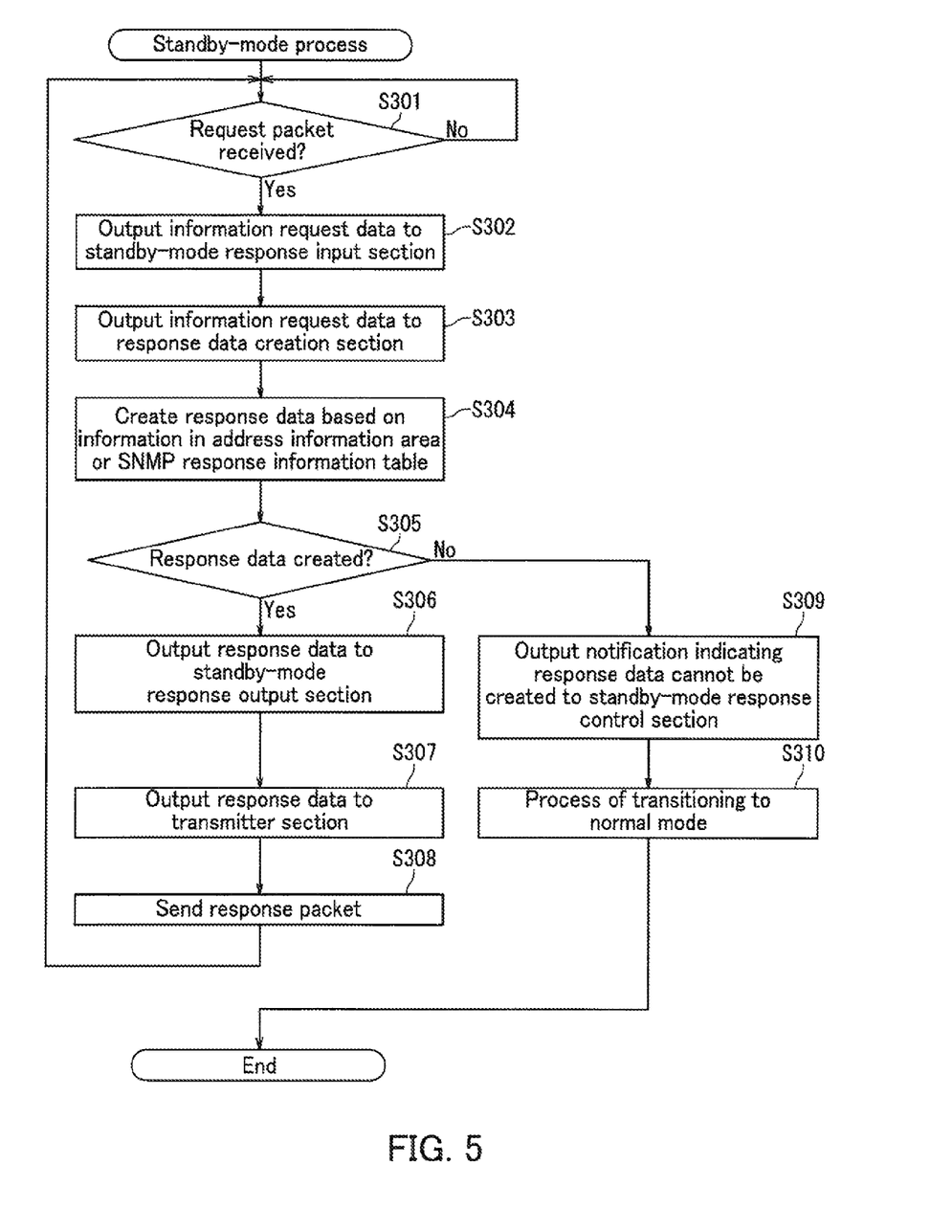
FIG. 5 is a flowchart of a process to be performed during the standby mode.

FIG. 5 is a flowchart of the standby-mode process.

(Step S301)

First, the receiver section 131 determines whether or not any request packets have been received. When the receiver section 131 has received one or more request packets (Yes in Step S301), the process proceeds to Step S302. On the other hand, when no request packets have been received (No in Step S301), the receiver section 131 waits until it receives one or more request packets.

(Step S302)

When receiving the request packets (Yes in Step S301), the receiver section 131 outputs to the standby-mode response input section 122 information request data based on the request packets.

(Step S303)

Next, the standby-mode response input section 122 outputs to the response data creation section 125 the information request data input from the receiver section 131. The output destination of the standby-mode response input section 122 has been switched from the host system input section 112 to the response data creation section 125 in the processing of transitioning to the standby mode.

(Step S304)

Next, the response data creation section 125 retrieves necessary information from the address information area 126a or from the SNMP response information table 126b and creates response data based on the information retrieved.
(Step S305)

Next, the response data creation section 125 determines whether or not the response data has been created. When the response data creation section 125 has succeeded in creating the response data (Yes in Step S305), the process proceeds to Step S306. On the other hand, when the response data creation section 125 has failed in creating the response data (No in Step S305), the process proceeds to Step S309. The response data creation section 125 fails in creating the response data when information in the address information area 126a or in the SNMP response information table 126b is insufficient, or when response data other than that provided by the address resolution protocol (ARP) or by the SNMP is to be created, for example.
(Step S306)

When the response data has been created (Yes in Step S305), the response data creation section 125 outputs the response data to the standby-mode response output section 123.
(Step S307)

Next, the standby-mode response output section 123 outputs to the transmitter section 132 the response data input from the response data creation section 125.
(Step S308)

Next, once the response data has been input, the transmitter section 132 sends one or more packets (response packets) forming the response data to an appropriate destination via the communication network 300. For example, when the responding device 100 has received the request packets from the PC 200, the response packets are sent to the PC 200. Then, the process proceeds to Step S301.
(Step S309)

When the response data creation section 125 has failed in creating the response data (No in step S305), the response data creation section 125 outputs to the standby-mode response control section 121 a notification indicating that the response data cannot be created.
(Step S310)

Next, the standby-mode response control section 121 performs the process of transitioning to the normal mode. Then, the standby-mode process ends. In the present embodiment, the device transitions to the normal mode when the response data creation section 125 has failed in creating the response data (No in Step S305). However, the present disclosure is not limited thereto. For example, the device may stay in the standby mode when the response data creation section 125 has failed in creating the response data. In this case, the information request data received by the responding device 100 may be discarded.

Figure 6:
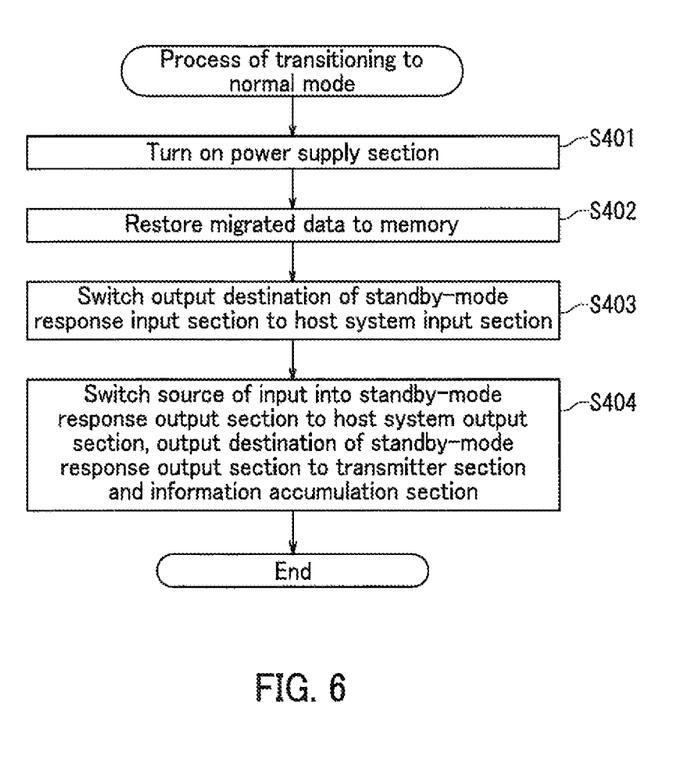
FIG. 6 is a flowchart of a process of transitioning to the normal mode.

FIG. 6 is a flowchart of the process of transitioning to the normal mode.
(Step S401)

First, the host power source control section 127 that has received a command from the standby-mode response control section 121 controls the power source of the power supply section 114 to be turned on. The power source of the power supply section 114 is turned on to resume the supply of electric power to each section of the host system 110. Thus, the operation of the host system 110 is resumed.
(Step S402)

Next, the host system control section 111 restores to the memories the data migrated to the disk.
(Step S403)

Next, the standby-mode response control section 121 switches the output destination of the standby-mode response input section 122 from the response data creation section 125 to the host system input section 112.
(Step S404)

Next, the standby-mode response control section 121 switches the source of the input into the standby-mode response output section 123 from the response data creation section 125 to the host system output section 113. The standby-mode response control section 121 switches the output destination of the standby-mode response output section 123 from only the transmitter section 132 to both the transmitter section 132 and the information accumulation section 124. Then, the process of transitioning to the normal mode ends.

As described above, the present embodiment employs the configuration in which the standby mode transition condition (second condition), which is a transition condition in terms of the information stored in the storage section 126, is explicitly set in addition to the first condition, and the responding device 100 transitions to the standby mode when both the first and second conditions are satisfied.

Such a configuration reduces wasted transition to the standby mode compared to the case where whether or not to transition to the standby mode is determined based only on the first condition. That is, when the information for creating the response data is not sufficiently accumulated in the storage section 126, in other words, when the response data creation section 125 is expected to fail in creating the response data, the transition to the standby mode is restricted even if the first condition is satisfied.

Accordingly, the normal mode is maintained when the response data creation section 125 is expected to fail in creating the response data, and thus it is possible to prevent the responsiveness to the information request data from the PC 200 from being impaired. When the transition to the standby mode is allowed, the information for creating the response data is sufficient, and thus the substitute responding system 120 can appropriately respond to the information request data from the PC 200. Thus, the responding device 100 according to the present embodiment can switch between the normal mode and the standby mode efficiently.

In the responding device 100 according to the present embodiment, the second condition in terms of the information stored in the storage section 126 is set in addition to the first condition as a condition for the transition to the standby mode. The substitute responding system 120 does not allow the transition to the standby mode when the second condition is not satisfied even if the first condition is satisfied.

Such a configuration enables the responding device 100 to transition to the standby mode with the appropriate timing so that the responding device 100 can be both in the standby mode and in the normal mode in good balance.

In addition, such a configuration enables the responding device 100 to ensure appropriate responsiveness to the information request data from the PC 200 since the responding device 100 can be both in the standby mode and in the normal mode in good balance.

Furthermore, such a configuration enables the responding device 100 to utilize the standby mode as appropriate depending on the environment in which the responding device 100 is being used.

The present disclosure is not limited to the above-described embodiments, and various alterations can be made within the scope not departing from the gist of the present disclosure.

What is claimed is:

1. A responding device having at least two operating modes including a normal mode and a standby mode in which more power is saved than in the normal mode, the responding device comprising:
a first responding unit that
operates during the normal mode and outputs, when receiving a request from a computer via a communication network, a response including information corresponding to the request to the computer, and does not operate during the standby mode; and
a second responding unit that outputs the response to the computer in place of the first responding unit during the standby mode where operation of the first responding unit is halted,
the second responding unit including:
a storage section that stores therein the information;
an information accumulation section that stores in the storage section the information included in the response output from the first responding unit during the normal mode; and
a mode transition control section that controls the responding device to transition from the normal mode to the standby mode when a first condition and a second condition are satisfied during the normal mode, wherein
the storage section includes an address information area and a simple network management protocol (SNMP) response information table,
the first condition is one of that a predetermined period of time has passed and that a command to transition to the standby mode has been received from a user,
the second condition includes
i) a minimum necessary level requiring that address information including an IP address and a MAC address is stored in the address information area, and
ii) a more stringent level than the minimum necessary level, the more stringent level requiring that the address information is stored in the address information area and SNMP information is stored in the SNMP response information table, the SNMP information being the information included in the response and corresponding to the request received from the computer,
the first responding unit selects one of the minimum necessary level and the more stringent level in the second condition,
the more stringent level includes a first level, a second level, and a third level,
the first level is that SNMP information indicating that information necessary for the computer to confirm whether the responding device is online or offline is stored in the storage section is stored in the SNMP response information table,
the second level is that SNMP information indicating that information necessary for first utility software for monitoring a state of the responding device and notifying of a change in the state is stored in the storage section is stored in the SNMP response information table,
the third level is that SNMP information indicating that information necessary for second utility software for setting or referring to information of the responding device is stored in the storage section is stored in the SNMP response information table, and
the first responding unit further selects some of the first level, the second level, and the third level in the second condition.

2. A responding device according to claim 1, wherein
i) if the responding device is connected to the communication network, the mode transition control section controls the responding device to transition from the normal mode to the standby mode when the first and second conditions are satisfied during the normal mode, and
ii) if the responding device is not connected to the communication network, the mode transition control section controls the responding device to transition from the normal mode to the standby mode when only the first condition is satisfied.

3. A responding method to be performed by a responding device having at least two operating modes including a normal mode and a standby mode in which more power is saved than in the normal mode, and including a first responding unit and a second responding unit having a storage section, the responding method comprising: outputting, via the first responding unit, a response to a computer during the normal mode when receiving a request from the computer via a communication network, the response including information corresponding to the request; storing in the storage section, via the second responding unit, the information included in the response output from the first responding unit during the normal mode; controlling, via the second responding unit, the responding device to transition from the normal mode to the standby mode when a first condition and a second condition are satisfied during the normal mode; and outputting, via the second responding unit in place of the first responding unit, the response during the standby mode where operation of the first responding unit is halted, wherein the storage section includes an address information area and a simple network management protocol (SNMP) response information table, the first condition is one of that a predetermined period of time has passed and that a command to transition to the standby mode has been received from a user, the second condition includes i) a minimum necessary level requiring that address information including an IP address and a MAC address is stored in the address information area, and ii) a more stringent level than the minimum necessary level, the more stringent level requiring that the address information is stored in the address information area and SNMP information is stored in the SNMP response information table, the SNMP information being the information included in the response and corresponding to the request received from the computer, the controlling includes selecting, via the first responding unit, one of the minimum necessary level and the more stringent level in the second condition, the more stringent level includes a first level, a second level, and a third level, the first level is that SNMP information indicating that information necessary for the computer to confirm whether the responding device is online or offline is stored in the storage section is stored in the SNMP response information table, the second level is that SNMP information indicating that information necessary for first utility software for monitoring a state of the responding device and notifying of a change in the state is stored in the storage section is stored in the SNMP response information table, the third level is that SNMP information indicating that information necessary for second utility software for setting or referring to information of the responding device is stored in the storage section is stored in the SNMP response information table, and the controlling includes further selecting, via the first responding unit, some of the first level, the second level, and the third level in the second condition.

4. A responding device according to claim 1,
further comprising an image forming section that forms an image on paper based on a command from the computer.

5. A responding device according to claim 1, wherein
the second responding unit further includes a response data creation section,
the response data creation section creates the response during the standby mode, and
when the response data creation section fails in creating the response, the second responding unit causes the responding device to transition from the standby mode to the normal mode.

6. A responding device according to claim 5, wherein
the response data creation section fails in creating the response at least one of i) when lacking the address information in the address information area, ii) when lacking the SNMP information in the SNMP response information table, and iii) when a response other than the response provided by address resolution protocol (ARP) or the SNMP is to be created.

* * * * *